Jan. 4, 1966  H. W. CARLISLE  3,227,583
STORAGE BATTERY
Filed Aug. 31, 1960
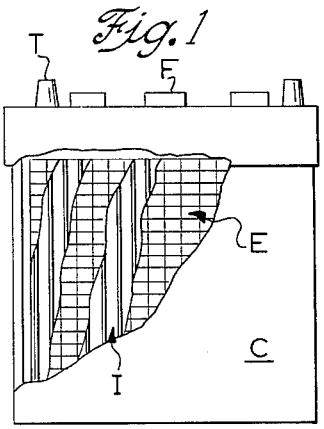
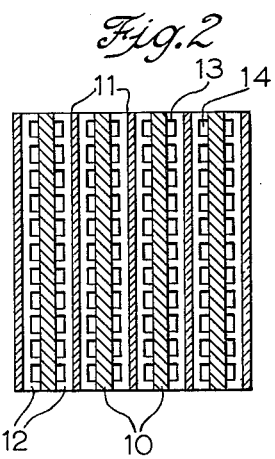
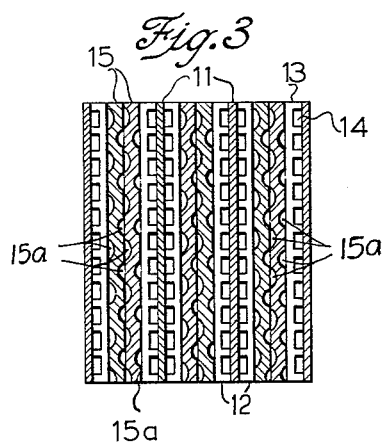
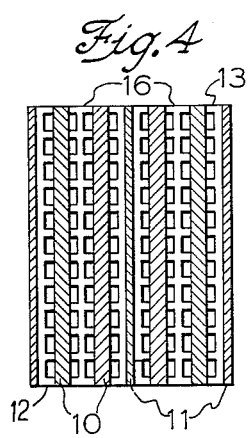
INVENTOR.
Henry W. Carlisle
BY
Williamson, Schroeder & Palmatier
ATTORNEYS

3,227,583
STORAGE BATTERY
Henry W. Carlisle, 9640 Nesbitt Road,
Minneapolis, Minn.
Filed Aug. 31, 1960, Ser. No. 55,614
5 Claims. (Cl. 136—6)

This invention relates to storage batteries, and particularly to improvements in the lead-sulphuric acid type of storage battery and is a continuation-in-part of my previous application, Serial No. 806,891, now abandoned, filed Apr. 16, 1959.

More particularly, this invention is directed towards storage batteries of the portable type, such as those used for starting service on automobiles, airplanes, buses, trucks, etc., and for motive power batteries for street and industrial trucks, electric locomotives, missiles, etc., where minimum weight and size and high discharge rates are required, although its utility is not limited thereto.

Manufacturers of conventional storage batteries of this type have, for a long period of time, adopted and followed a generally standard basic design and arrangement of the positive and negative plates comprising the battery. According to this standard arrangement, the positive and negative plates are of substantially the same height and width and disposed in parallel, laterally spaced apart aligned relationship, with the positive and negative plates successively alternating—negative, positive, negative—etc. The plates of like polarity in each cell are lead burned by their conducting lugs to a common strap having a suitable terminal post which passes through the cover of the battery and is designed for attachment either to the intercell connector extending to the adjacent cell or for connection to the external circuit. In this standard battery assemblies there is one more negative plate than positive, with the two outside plates being negative. The capacity of a cell or battery is determined by the amount of active material in the positive or negative plates (whichever is limiting). In this type of storage battery the positive plates usually limit the capacity of the cell.

The electrolyte for lead storage batteries is sulphuric acid, the specific gravity of which varies according to the particular use to which the battery is to be put. For portable batteries of the type where minimum weight and high discharge rates are required, a nominal full charge specific gravity of about 1.280 is usual for the electrolyte, the positive and negative plates being immersed in said sulphuric acid.

The lead plates, both positive and negative, usually are one of the two well known standard types, either the formed or the pasted type, both of which are well known in the art and need not be elaborated upon.

Theoretically, the ultimate capacity of a storage battery or cell is determined by the amount of active material in the positive or negative plates (whichever is limiting), provided there is a sufficient quantity of electrolyte for the complete reaction. This ultimate capacity may also be expressed as the total positive plate capacity or total negative plate capacity, whichever is the least and therefore the limiting capacity, since the lowest total capacity of either the positive or negative plates determines the ultimate capacity of the cell or battery, with any additional capacity provided by the plates of opposite polarity being excess.

Due to the inherent differences in the active material of the positive and negative plates, the capacity of the individual negative plates per unit of plate surface area is greater than that of the positive plates. In a standard storage battery where the positive and negative plates are of the same plate surface area (having the same height and width), and where the positive and negative plates alternate with a negative plate on each side of each positive plate so that each cell or battery has one more negative plate than positive, the negative capacity materially exceeds the positive capacity, which excess becomes increasingly greater as the size of the cells or batteries increase and as the total number of plates increases. As a result, each standard conventional storage battery has a substantial excess of unnecessary negative capacity which is never utilized, with the weight and space of the negative electrodes represented by this excess capacity and extra casing material needed to house the excess electrodes providing this excess negative capacity reducing the capacity of the battery per unit of weight and volume and increasing the cost per unit of capacity.

However, the ultimate capacity is seldom realized due to the fact that before the active material is fully utilized or converted, the terminal voltage drops below the useful value. The available capacity therefore depends upon the amount of active material which can take part in the chemical reaction before the limiting, terminal or final voltage is reached.

The limitation of plate capacity at a given discharge rate and final voltage is largely due to the depletion of acid concentration in the pores of the plates. To maintain the discharge, this acid concentration must be maintained by diffusion with the stronger acid in the cell, and as the discharge reaction penetrates further into the plate, this diffusion is retarded until finally the acid concentration is reduced below that required for the minimum voltage. Therefore, increasing the thickness of the positive plates increases the actual capacity thereof only to a certain point, after which any additional thickness simply adds to the life of the plate and not to its capacity. Positive plates are frequently thicker than the negative plates, but despite being thicker still have a lower capacity than the thinner negative plates, the thicker positive plates being heavier and more expensive than the thinner positive plates.

A general object of this invention is to provide an improved storage battery of the type hereinbefore described.

Another object is to provide a storage battery of the class described which has increased capacity per unit of space occupied and per unit of weight.

Still another object is to provide an improved storage battery of the class described which is similar in all respects to any one of the conventional batteries hereinbefore described including materials of construction, size of plates, strength of electrolyte, individual plate capacity, both positive and negative, and total rated battery capacity and substantially equal in performance capabilities except for the number and arrangement of the plates, the novel battery of this invention occupying less space and being lighter in weight and less expensive to build than an unimproved corresponding conventional battery of similar construction and performance capabilities.

A further object is a novel method of improving a conventional storage battery of the class described to increase its capacity and performance capabilities by simply changing the ratio of positive to negative plates and the relative arrangement therebetween.

Still another object is to provide an improved storage battery of the class described which is similar in all respects to a conventional battery both in construction and capacity except for the ratio of positive plates to negative plates and the relative arrangement therebetween, and which is capable of superior performance under a cold test under severely low temperature conditions by discharging for a longer period of time at a given discharge rate than a corresponding conventional battery before the limiting or final discharge voltage is reached.

Still another object is to provide an improved storage battery of the class described which is similar in all respects to a conventional battery both in construction and capacity except for the ratio of positive plates to negative plates and the relative arrangement therebetween and which is capable of maintaining high discharge rates for a longer period of time and capable of superior cold testing than conventional corresponding batteries and which can be accomplished with an electrolyte of lower specific gravity than normally required in conventional batteries.

Still another object is to increase the life of a conventional storage battery of the type described by changing the relative arrangement and ratio between the positive and negative plates.

A still further object is a novel method of improving a conventional storage battery, particularly one of the lead-acid type, utilizing negative plates which have greater individual capacity than the positive plates by rearranging the relative relationship and ratio between the positive and negative plates to more nearly equalize the total positive and negative capacities in any given battery and thereby reduce the amount of excess, unnecessary capacity presently found in conventional storage batteries.

These and other objects and advantages of this invention will more fully appear from the following description made in connection with the accompanying drawings wherein like reference characters refer to the same or similar parts throughout the several views, and in which:

FIG. 1 is a side elevation of a battery with a portion thereof broken away;

FIG. 2 is a diagrammatic top plan of the plate and partition arrangement found in a conventional storage battery;

FIG. 3 is a diagrammatic top plan of the plate and partition arrangement of one preferred form of the storage battery of this invention employing corrugated or grooved positive plates; and FIG. 4 is a diagrammatic top plan of the plate and partition arrangement in another preferred form of storage battery of this invention employing non-corrugated conventionally styled positive plates.

Referring to the drawings, FIG. 1 illustrates a storage battery which in general construction and outline is typical of both the conventional storage battery and the batteries of my invention, in which electrode E and vertically ribbed separators or insulators I are vertically disposed within the battery casing C, which carries the usual terminal posts T and the filler cap F for the addition of electrolyte or water to the battery.

I have discovered that the conventional lead-acid storage batteries hereinbefore described can be substantially improved upon by a simple rearrangement of the positive and negative plates presently employed, which rearrangement results in an increased ratio of active positive material to active negative material exposed to the action of the electrolyte, which rearrangement enables cell or battery capacity to be maintained at a predetermined amount while reducing the required number of negative plates, which in turn permits a reduction in the size, weight and cost of any conventional cell or battery of given capacity without adversely affecting the performance thereof.

This same rearrangement enables the capacity and performance capabilities of any conventional lead-acid storage battery to be improved and increased while maintaining all things the same, including the total number of plates, excepting the relative arrangement between the positive and negative plates and the resulting increase in the ratio of active positive material to active negative material, thereby effecting an increase in the ratio of total positive plate capacity to total negative plate capacity. In any event, regardless of the specific manner in which the invention is adopted and applied, the rearrangement of the plates and the corresponding change in the ratio of positive to negative active material and change in the ratio of total positive capacity to total negative capacity relative to the ultimate or actual capacity of the cell or battery will result in an increase in the ultimate and actual capacity of the cell or battery per unit of size, weight, space occupied and cost.

Thus, any of the conventional storage batteries of the lead-acid type hereinbefore described utilizing multiple plate cells in which the positive and negative plates are alternately arranged with one more negative and in which the individual capacity of each negative plate is greater than the individual capacity of each positive plate can be improved by simply rearranging the plates as set forth hereinafter in accordance with my invention so as to require fewer negative plates, and be lighter and smaller and less expensive per unit of ultimate or actual capacity.

FIG. 2 illustrates the conventional interior arrangement of a storage battery, in which each positive electrode plate 10 is sandwiched between a pair of thinner negative electrode plates 11 of greater individual capacity than the thicker positive plates and maintained in spaced apart relationship therefrom by insulators 12 of suitable non-conducting material which permits the current to pass, such as wood, glass or plastic, having vertically disposed spaced apart ribs 13 on one face thereof defining channels or passageways 14 and engaging one of the electrode surfaces to promote circulation of the electrolyte past the electrode surfaces. Thus, in each conventional cell or battery the positive and negative plates are alternately arranged and follow the pattern of negative, insulator, positive, insulator, negative, insulator, positive, insulator, and so forth. Therefore, in a typical conventional nine plate battery cell as illustrated in FIG. 2, there are four positive plates, five negative plates, and eight insulators. In this arrangement, the number of positive plates and amount of active positive material exposed to the action of the electrolyte is less than the number of negative plates and amount of active negative material, resulting in an excess of total negative capacity which is wasted, since the capacity of the cell is determined by whichever plates have the lower or limiting total positive or negative capacity. In this conventional arrangement, the total positive plate capacity is the limiting factor, with the excess negative capacity going for naught. This unnecessary excess progressively increases as the total number of plates increases.

Any conventional storage lead-acid battery having an arrangement of plates corresponding to that shown in FIG. 2 wherein the individual negative plate capacity is greater than the individual positive plate capacity can be improved upon by simply arranging the positive and negative plates in the manner shown in FIGS. 3 and 4. This, of course, assumes that in the new arrangement according to this invention that everything in the new battery is substantially the same as in the particular conventional battery being improved upon with regards to the dimensions and capacity of the individual plates, the only significant difference being in the arrangement of the plates and the ratio or relative number of positive and negative plates, the new improved battery being smaller in size and lighter in weight and less expensive to make per unit of rated or output capacity of the cell or battery than the corresponding conventional battery.

My invention, briefly stated, consists of reducing or eliminating the excess unused capacity of conventional storage batteries by placing more than one, and usually two positive plates between each pair of negative plates, and is illustrated in FIGS. 3 and 4. The forms of my invention illustrated in FIGS. 3 and 4 are basically similar and vary only insofar as the differences in the design of positive plates employed require them to be. In the arrangement of FIGS. 3 and 4, both forms employ an arrangement of positive and negative plates whereby two positive plates are sandwiched or disposed between each pair of negative plates. Thus, each battery cell of my invention utilizes a minimum of four total plates consisting of two positive plates disposed between a pair of negative plates with the positive plates being so disposed that each side or working face thereof is substantially entirely exposed to the action of the electrolyte. This is in contrast to the basic or minimum unit or cell of the conventional battery which utilizes a total number of three plates consisting of a single positive plate disposed or sandwiched between a pair of negative plates. Therefore, the ratio of total active positive material exposed to the action of the electrolyte and the total positive capacity to the active negative material exposed to the action of the electrolyte and the total negative capacity is higher or greater in the battery of my invention than it is in a conventional battery or cell. In the conventional arrangement, the number of positive plates is always less than the number of negative plates, whereas in my invention the number of positive plates is always equal to or greater than the number of negative plates. The plate arrangement of my invention assumes and is premised on the presumption the individual capacity of the positive plates is less than the individual capacity of the negative plates.

Thus, in the cell or battery illustrated in FIG. 3, there are six positive plates exposed to the action of the electrolyte and four negative plates exposed to the action of the electrolyte providing a positive plate to negative plate ratio of 3:2 or greater than 1. Under the conventional arrangement the ratio would be less than 1. In the cell illustrated in FIG. 4, there are four positive plates exposed to the action of the electrolyte and the three negative plates exposed to the action of the electrolyte to again provide a positive to negative plate ratio greater than 1 (4:3).

It will be further understood that the battery cells illustrated in the drawings are simply illustrative of the arrangement of the plates in any given cell and are not intended to limit in any way the total number of plates which may be employed in any given cell or battery, and the total number of plates employed in my invention may be greater or less than the number shown in the drawing with the minimal arrangement being as previously noted namely two positive plates sandwiched between a pair of negative plates. In most portable batteries of the type used for starting service on automobiles and the like, and for motive power, each cell is multi-plate in nature and normally employs between eleven and nineteen total plates per cell.

In the form of my invention illustrated in FIG. 3, pairs of corrugated positive plates 15 are disposed between pairs of negative plates 11 with suitable separators 12 interposed between the opposing positive and negative plates and extending therebetween. The positive plates 15 of FIG. 3 have vertically extending spaced apart grooves 15a disposed on the faces thereof. These positive plates 15 are preferably of the type disclosed and claimed in my earlier Patent No. 2,191,313, issued Feb. 20, 1940, and are of a thickness corresponding to the flat face type conventionally employed and illustrated in FIG. 4. The grooves on the opposite faces of each of the positive plates of FIG. 3 are staggered with respect to one another so that when a pair of the plates are laid up against one another as shown in FIG. 3 the plates contact each other only by point contact with the outermost face portion of each of the plates between each of the grooves being opposed by one of the grooves on the opposing plates so that substantially the entire surface of each of the positive plates directly opposed to one another is exposed to the action of the electrolyte which is free to circulate in the grooves 15a. The positive plates 15 and the negative plates 11 are of lead, the active material being $PbO_2$ and sponge lead on the positive and negative plates. The separators 13 are also of any conventional design and material and may be of wood, glass, plastic, asbestos, rubber or any other suitable non-conductor which permits current to pass between the positive and negative plates and serve as mechanical spacers to prevent actual contact between the positive and negative plates to prevent short circuiting of the plates.

It will also be noted that in the arrangement of FIG. 3, all of the plates are properly supported and braced to enable them to resist physical shock and strain during use. Thus, the arrangement in the form of the invention shown in FIG. 3 follows the pattern or arrangement, negative, insulator, two positives, insulator, negative, insulator, two positives, etc.

It will also be noted that in the form of my invention shown in FIG. 3, each side of each of the positive plates is substantially entirely exposed to the action of the electrolyte to provide maximum capacity for each of the positive plates, and substantially increase the total positive plate capacity over what it would be if there were no circulation of electrolyte between the opposed faces of the positive plates and only the outer faces thereof were acted upon by the electrolyte.

The form of my invention illustrated in FIG. 4 is substantially the same as that shown in FIG. 3 with the exception that the design of the positive plates 10 is not the corrugated design shown in FIG. 3 but rather corresponds to the flatter conventional type. Therefore, to permit and achieve adequate circulation of the electrolyte past the directly opposed faces of each pair of adjacent positive plates so as to enable both sides of each of the positive plates to be adequately exposed to the action of the electrolyte, the positive plates 10 in FIG. 4 are separated by a separator 16, the insulators 12 separating the opposed positive and negative plates.

It will be understood that the design of the separators 16 and insulators 12 may be varied as desired so long as they adequately accomplish the purpose for which they are intended. However, the primary purpose of the insulators 12 and separators 16 differ. Thus, the insulators 12 interposed between the opposing positive and negative plates in all storage batteries, both conventional and this invention, are intended primarily to prevent any short circuiting contacts between the positive and negative plates and to prevent the growth of "lead trees" formed by small particles of sediment lodging on the negative plate and finally bridging across to the positive to form a short circuit. Thus, in short, the insulators 12 are primarily intended to "insulate," that is, to prevent short circuiting between the opposing positive and negative plates. On the other hand, the separators 16 interposed between adjacent opposing positive plates are not intended to prevent short circuiting since both of the plates are of like polarity, and could not short circuit even if coming in contact with one another. The primary purpose of the separators 16 are to maintain the positive plates in spaced apart relationship so that the electrolyte can actively engage substantially the entire surface of both of the opposing positive plates during the entire life of the battery. If the opposing pairs of positive plates were not bridged or braced by separators 16 as illustrated in FIG. 4, they might very well be eventually expanded or moved into contact with one another by the expansion of the plates which normally occurs during service, which contact between the opposing positive surfaces would cut off the circulation of the electrolyte therebetween and thereby materially limit the amount of active positive material exposed to the action of the electrolyte and thereby reduce the total positive plate capacity of the cell or battery.

Also, the separators 16 provide an arrangement in which all of the plates are braced from one side of the cell to the other to enable it to resist the shock and strain during use. Thus, in the arrangement of my invention as illustrated in FIG. 4, the pattern is as follows: negative, insulator, positive, separator, positive, insulator, negative, insulator, etc., with a pair of positive plates providing four surfaces of active material sandwiched between a pair of negative plates, the same as in the form of my invention illustrated in FIG. 3. Thus, in the battery or cell shown in FIG. 4, four positive plates, three negative plates and six insulators or separators are utilized.

The importance and advantages of my invention can be illustrated by a comparison between conventional storage batteries and the storage batteries of my invention. In this comparison, it is assumed that the individual positive plate capacities in both the conventional battery and my battery are the same, and that the individual negative plate capacities in both the conventional battery and mine are the same, with the individual negative plate capacity in each battery being greater than the individual positive plate capacity.

It is further assumed (only for the purposes of illustration) that the individual positive plates capacity is one unit per plate, and that the individual negative plate capacity is 1.6 units per plate. It is further assumed that the same electrolyte is used in each type of battery, and that the plates are arranged as illustrated in the accompanying drawings, the plates in the conventional battery being arranged as in FIG. 2, the plates of my invention being arranged as in FIGS. 3 and 4. Based on these assumptions, the following tabulations have been prepared, which illustrate conventional batteries and the batteries arranged according to my invention, each table listing a series of different batteries or cells of each kind (conventional and this invention) having different numbers of total plates, the number of positive and negative plates in each, and the total positive and negative plate capacity in each cell or battery in units, arrived at in each instance by multiplying the total number of positive plates in the cell by the unit capacity for each positive plate, namely 1, and by multiplying the total number of negative plates in each cell by the unit capacity for each negative plate, namely 1.6, the limiting unit capacity in each cell being underlined.

TABLE I

*Conventional battery*

| Total Plates | Positive Plates | Negative Plates | Positive Capacity | Negative Capacity |
|---|---|---|---|---|
| 3 | 1 | 2 | <u>1</u> | 3.2 |
| 5 | 2 | 3 | <u>2</u> | 4.8 |
| 7 | 3 | 4 | <u>3</u> | 6.4 |
| 9 | 4 | 5 | <u>4</u> | 8.0 |
| 11 | 5 | 6 | <u>5</u> | 9.6 |
| 13 | 6 | 7 | <u>6</u> | 11.2 |
| 15 | 7 | 8 | <u>7</u> | 12.8 |
| 17 | 8 | 9 | <u>8</u> | 14.4 |
| 19 | 9 | 10 | <u>9</u> | 16.0 |
| 21 | 10 | 11 | <u>10</u> | 17.6 |
| 23 | 11 | 12 | <u>11</u> | 19.2 |
| 25 | 12 | 13 | <u>12</u> | 20.8 |
| 27 | 13 | 14 | <u>13</u> | 22.4 |

*Improved battery of this invention*

| Total Plates | Positive Plates | Negative Plates | Positive Capacity | Negative Capacity |
|---|---|---|---|---|
| 4 | 2 | 2 | <u>2</u> | 3.2 |
| 7 | 4 | 3 | <u>4</u> | 4.8 |
| 10 | 6 | 4 | <u>6</u> | 6.4 |
| 13 | 8 | 5 | <u>8</u> | 8.0 |
| 16 | 10 | 6 | 10 | <u>9.6</u> |
| 19 | 12 | 7 | 12 | <u>11.2</u> |
| 22 | 14 | 8 | 14 | <u>12.8</u> |
| 25 | 16 | 9 | 16 | <u>14.4</u> |
| 28 | 18 | 10 | 18 | <u>16.0</u> |

From the foregoing Table I, it can readily be seen that a battery of my invention having the same total number of plates as a corresponding conventional battery will in all cases have a greater ultimate or actual capacity than the conventional battery, the limiting capacity in my battery being either positive or negative depending on the total number of plates employed. Thus, greater ultimate or actual battery capacity can be achieved by my invention with the same space and weight requirements of a conventional battery. The following Table II illustrates this, which table is assembled from the data of Table I, the ultimate capacities indicated being the limiting total positive or negatives capacities in each case, the excess capacities indicated being the difference between the total positive capacities and total negative capacities in any given cell as expressed in Table I.

TABLE II

| Total Plates | Conventional Capacity In Units | | Capacity in Units This Invention | |
|---|---|---|---|---|
| | Ultimate | Excess | Ultimate | Excess |
| 7 | 3 | 3.4 | 4 | .8 |
| 13 | 6 | 5.2 | 8 | 0 |
| 19 | 9 | 7.0 | 11.2 | .8 |
| 25 | 12 | 8.8 | 14.4 | 1.6 |

In addition to illustrating the fact that a battery of my invention has a higher capacity than a comparable conventional battery having the same total number of plates, Table II further illustrates, as does Table I, that in each instance my battery has proportionately less "excess" or wasted capacity than a conventional battery, thereby increasing the efficiency of the battery.

From Table I it will also be appreciated that a battery or cell of my invention having a given ultimate or actual capacity as expressed by the limiting total positive or negative unit capacity of Table I will require substantially fewer total number of plates than a conventional battery having the same, or approximately the same actual or ultimate capacity. Thus, the same ultimate or actual battery capacity can be achieved with less space and weight and expense by my invention. The following Table III illustrates this, which table is again assembled from the data of Table I, with the ultimate capacity representing the limiting total positive or negative capacity in each case.

TABLE III

| Ultimate Capacity In Units | Total Plates Conventional | Total Plates This Invention |
|---|---|---|
| 2 | 5 | 4 |
| 4 | 9 | 7 |
| 6 | 13 | 10 |
| 8 | 17 | 13 |
| Approx. 10 | 21 | 16 |

From the foregoing, it can be seen and readily appreciated that by constructing a storage battery according to my invention, the ratio of ultimate or actual capacity of the battery or cell to the volume of space occupied, weight and cost is materially increased, thereby constituting a significant advance in the storage battery art. It will be understood that the relative difference in capacity between the individual negative and positive plates utilized for the foregoing tabulation is merely illustrative, and that other relative differences or ratios may exist in actual practice. However, as long as the individual negative plate capacity exceeds the individual positive plate capacity, the same comparative results will occur.

It will thus be readily appreciated from the foregoing tabulations that the importance and significance of my invention progressively assumes greater importance as the number of positive plates in any cell needed to provide a given rated capacity for the cell increases. This is particularly so when one considers that most of the portable batteries designed for starting service on automobiles and the like are multi-plate cells which utilize normally from eleven to nineteen plates in each of the cells of the battery and that most of these batteries are three or six cell batteries. Thus, a three cell battery of the conventional type having seventeen plates per cell (eight positive and nine negative) or twenty-four positive and twenty-seven negative plates in the entire battery could be modified according to my invention to have the same output capacity while utilizing twenty-four positive plates but only fifteen negative plates, or twelve fewer negative plates than in the conventional form, which it will be recognized enables the battery to be assembled in a substantially smaller size or space with considerably less weight and expense, thereby increasing the capacity or output of the battery per unit of space occupied and per unit of total weight.

It will be further recognized that the alternative with regards to the saving in size, weight and expense is the fact that my invention also permits increased battery capacity to be built into the same volume of space and with substantially the same amount of weight as presently provided by conventional storage batteries.

In addition to increasing the capacity of conventional storage battery per unit of space occupied and total weight, the arrangement of my invention also results in superior performance under certain conditions and increases the life of the battery. A significant difference in performance between the battery of my invention and a corresponding conventional battery having the same total number of plates, and positive and negative plates having the same individual capacities in each type of battery and differing only in the arrangement of plates as hereinbefore described is in the ability of the battery of my invention to maintain a high rate of discharge for a longer period of time than the corresponding conventional battery before the terminal voltage of the cell drops below the final discharge voltage or useful value at which point the battery ceases to discharge. The significance is particularly notable when the batteries are discharging under a heavy load at very cold temperatures. Thus, as applied to a battery for servicing an automobile for starting the motor, the battery of my invention will discharge at a given rate for a longer period of time at cold temperatures than will said corresponding conventional storage battery which is very important in many circumstances, such as in starting automobile engines and other motors at very cold temperatures such as zero temperatures and below, these superior results having been proved both in testing and in use.

To illustrate an actual example of the advantages of a battery of my invention over a comparable conventional battery, two comparable batteries were subjected to series of tests. One of these batteries was purchased on the open market and tested as purchased. The other battery was assembled from other batteries of identically the same make as the one first mentioned, this improved battery being the same as the first named battery except for the arrangement of the plates. These comparable batteries were each three cell, six volt batteries, each having a total of thirteen lead plates per cell. The batteries were identically the same in all respects with regards to the manner and materials of construction, except that the plates in each cell in one battery were of the conventional arrangement, as shown in FIG. 2, while the plates in each cell of the other battery were arranged according to my invention as illustrated in FIG. 4. Thus, each cell of the conventional battery had six positive and seven negative plates, while the battery arranged according to my invention had eight positive and five negative plates per cell. The plates, both positive and negative, in each battery were 5⅝" by 4⅞" in height and width, and .06" in thickness, with the insulators and separators being of plastic. The sulphuric acid electrolyte in each battery was the same and of a specific gravity of 1.260 at 80° F. Under a standard cold test at 0° F. under a load of 300 amperes, the conventional battery discharged under said load for 2.2 minutes before the final or limiting voltage of 1.5 was reached. On the other hand, the battery of my invention under the same test conditions and load took 3.3 minutes to reach the same limiting voltage of 1.5, the important significance of this difference in time in reaching the final voltage being apparent to those skilled in the art. This difference is very important in circumstances such as starting an automobile in cold weather, where my battery holds up and lasts longer than a comparable conventional battery. The battery of my invention also had a higher capacity rating than the conventional battery, my battery having a capacity of 100 ampere hours, whereas the conventional battery had a capacity of only 80 ampere hours. Thus, under a load of 5 amperes, my battery discharged for 20 hours, whereas under the same load the conventional battery only discharged for 16 hours. The same life test was also run on the two batteries by constantly cycling the batteries, that is constantly discharging, re-charging, discharging, etc., to determine which battery would last the longest. Under identical test conditions, the conventional battery lasted for 14 months before breaking down. On the other hand, the battery of my invention was still going strong after 16 months of similar service.

It is also important to note that in each situation where the conventional battery and the battery of my invention are comparable, either in ultimate capacity or in total number of plates, that there is considerably less wasted or unused capacity (that which is in excess of the limiting capacity) in my battery than in the comparable conventional battery, relative to the total number of plates or capacity of the cell, and that in each instance, the total positive and negative capacities are more nearly equal or the same as compared with the relative positive and negative capacities of conventional batteries.

Experimentation and testing has also shown that a weaker acid or one of the lower specific gravity in a battery of my invention than in a comparable conventional battery having the same total number of plates. Thus, where the standard battery normally employs a sulphuric acid electrolyte having a specific gravity of 1.260 to 1.275, I have been able to achieve equivalent or superior performance in my battery with an acid having a specific gravity in the range of 1.235 to 1.240. This ability to use a weaker electrolyte is advantageous from several viewpoints. The weaker electrolyte is lighter in weight than the heavier electrolyte, less expensive, and the weaker electrolyte solution simplifies the casting of the grid since they are less prone to destructive attack by the weaker electrolyte solution.

Although the emphasis in the foregoing description has been on the use of two positive plates between each pair of negative plates, it will be understood that in some circumstances an improved battery will result from using more than two positive plates between each pair of negative plates, and my invention is intended to cover such situations within its scope. The effectiveness and desirability of using more than two positive plates between each pair of negatives depends primarily on the degree of difference in individual capacity between the positive and negative plates, the desirability of using more than two positives between each pair of negatives increasing as the difference in capacity between the plates increases. However, the arrangement of my invention illustrated in the drawings using two positives between two negatives always produces a better battery, regardless of the difference in individual plate capacity between the positive and negative plates, the particular comparable cell or battery capacity, or the comparable total number of plates, and in most instances is the preferred arrangement.

It will also be recognized that batteries of my invention having ultimate capacities similar to comparable conventional batteries but having fewer total plates also have need for fewer insulators, thereby further reducing the overall size of the cell or battery necessary to provide a given cell capacity.

From the foregoing the advantages of my invention are readily apparent. Arranging any conventional lead-acid storage battery according to the methods set forth herein provides a battery having a greater capacity per unit of weight and per unit of space occupied, reduces the cost of construction and provides a battery which is capable of superior performance under heavy loads or overloads, permits a weaker electrolyte solution to be employed and increases the life of the battery.

It will, of course, be understood that various changes may be made in the form, details, arrangement and proportions of the various parts without departing from the scope of my invention.

What I claim is:

1. In a storage battery including a plurality of positive and negative electrode plates and a fluid electrolyte wherein the capacity of the individual negative plates is greater than the capacity of the individual positive plates, a cell arrangement wherein said cell comprises two or more basic cell units, each of said basic units comprising at least a pair of positive electrode plates disposed between a pair of negative plates, said positive plates having both sides of each exposed to the action of the electrolyte, adjacent units having one negative plate in common, and wherein the positive plates have corrugated faces, and wherein each pair of positive plates sandwiched between a pair of negative plates are laid up against one another in face-to-face relationship, the corrugated portions of each opposed face being offset with respect to the corrugations of the opposite face, thereby exposing substantially all of each opposing face to the action of the electrolyte.

2. In a storage battery of the lead-sulphuric acid type employing a sulphuric acid electrolyte and positive and negative lead electrode plates exposed to the action of said electrolyte and wherein the capacity of the individual negative plates is greater than the capacity of the individual positive plates, the arrangement wherein at least a pair of positive plates are disposed between each adjacent pair of negative plates.

3. In a storage battery of the lead-sulphuric acid type including a sulphuric acid electrolyte and positive and negative lead electrode plates exposed to the action of said electrolyte and wherein the capacity of the individual negative plates is greater than the capacity of the individual positive plates, a cell arrangement wherein said cell comprises a series of two or more basic cell units, each of said basic units comprising at least a pair of positive electrode plates disposed between a pair of negative plates, said positive plates having both sides of each exposed to the action of the electrolyte, adjacent units having one negative plate in common.

4. In a storage battery of the lead-sulphuric acid type comprising sulphuric acid electrolyte and positive and negative lead plates in parallel laterally aligned relationship, and wherein the capacity of the individual negative plates is greater than the capacity of the individual positive plates, and wherein both sides of each positive plate is exposed to the action of the electrolyte, and wherein the negative plates are in spaced apart relationship, the arrangement wherein more than one positive plate is disposed between each pair of adjacent negative plates and wherein the battery capacity is greater than a comparable battery having the same positive and negative plates and electrolyte and the same total number of plates and having the positive and negative plates alternately arranged therein.

5. The battery of claim 4, wherein each positive plate is flanked on both sides by a negative plate.

References Cited by the Examiner

UNITED STATES PATENTS

| 266,114 | 10/1882 | Eaton | 136—6 |
| 496,126 | 4/1893 | La Roche | 136—6 |
| 1,369,931 | 3/1921 | McCreary | 136—6 |
| 3,023,258 | 2/1962 | Peters | 136—6 |

FOREIGN PATENTS

| 548,925 | 11/1957 | Canada. |
| 769,784 | 5/1957 | Great Britain. |

OTHER REFERENCES

Vianl: Primary Batteries, 3d edition, p. 287, 2d full paragraph, last line.

WINSTON A. DOUGLAS, *Primary Examiner.*

JOHN R. SPECK, MURRAY A. TILLMAN,
*Examiners.*